No. 828,416. PATENTED AUG. 14, 1906.
F. MESINGER.
TIRE.
APPLICATION FILED NOV. 16, 1905.
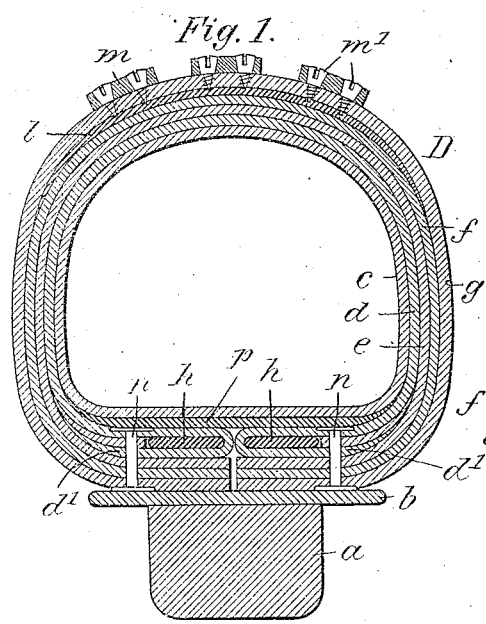
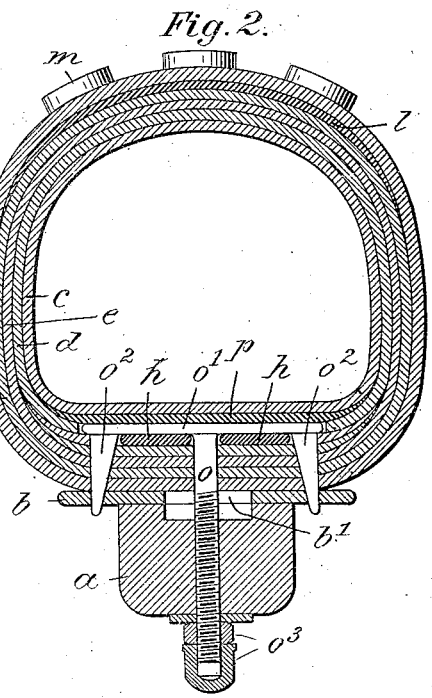
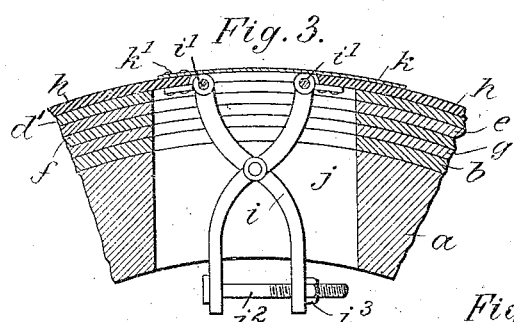
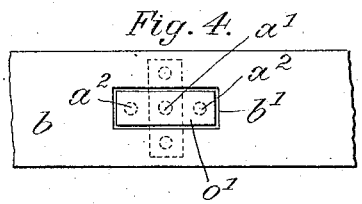
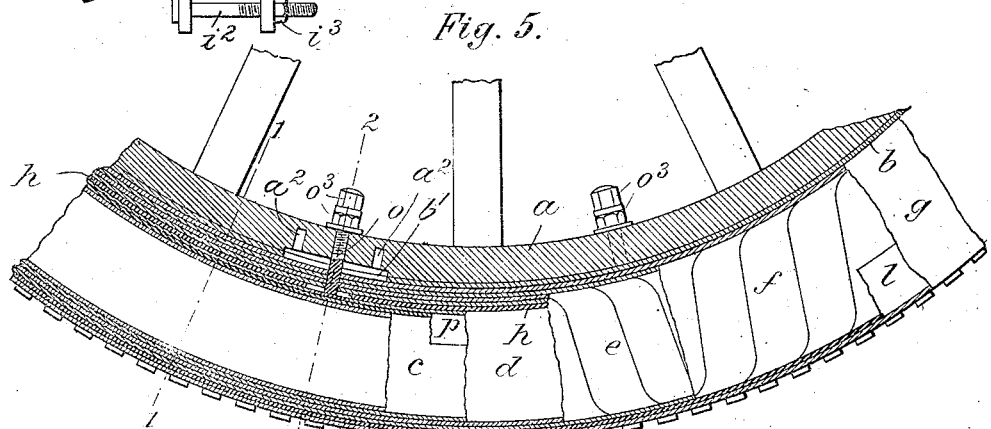
Witnesses:
Arthur Jumpe.
William Schultz.
Inventor:
Frederick Mesinger
by Hauke v Briesen Atty.

UNITED STATES PATENT OFFICE.

FREDERICK MESINGER, OF NEW YORK, N. Y.

TIRE.

No. 828,416.

Specification of Letters Patent.

Patented Aug. 14, 1906.

Application filed November 16, 1905. Serial No. 287,574.

*To all whom it may concern:*

Be it known that I, FREDERICK MESINGER, a citizen of the United States, residing at New York city, Bronx, county and State of New York, have invented new and useful Improvements in Tires, of which the following is a specification.

This invention relates to a tire which is of superior strength, may be quickly applied, and is so constructed that its parts may be readily assembled.

In the accompanying drawings, Figure 1 is an enlarged cross-section of my improved tire on line 1 1, Fig. 5; Fig. 2, a similar cross-section on line 2 2, Fig. 5; Fig. 3, a detail of the tong for connecting the ends of the ring; Fig. 4, a detail of part of the wheel-rim, showing the fastener; and Fig. 5, a longitudinal section, partly in side view, of a part of the tire.

The letter $a$ indicates the felly of a wheel, reinforced by a metal rim $b$, while $c$ is the inflation-tube inclosed within the tire D. This tire is made up of four layers $d$, $e$, $f$, and $g$, all preferably composed of leather. The innermost layer $d$ is made in the form of a longitudinally-split tube the ends of which are turned outward, at at $d'$, Fig. 1. These outwardly-turned ends embrace a pair of reinforcing open rings $h$, embedded within the tire concentric to the wheel-rim. The ends of each of the rings $h$ are adjustably connected to each other by means of a tong $i$, received within an opening $j$ of the tire and wheel. The members of tong $i$ are pivoted at $i'$ to the ends of the ring $h$, while a bolt $i^2$, engaging the opposite ends of the tong members and carrying a nut $i^3$, permits the ring to be drawn together by setting the tong. A curved plate $k$, secured at $k'$ to one end of ring $h$ and projecting over its other end, serves to close the gap in the ring.

The layer $e$ is composed of a strip of leather spirally wound upon inner tube $d$. The layer $f$ is composed of a similarly-wound strip the windings of which extend in a direction opposite to those of layer $e$. The winding $f$ is surrounded by the outer tube $g$, while a strip $l$ is interposed between the parts $f$ $g$ along the outer side of the tire.

To tube $g$ are secured a number of leather runners $m$ by means of screws $m'$, having tapering heads which are received by perforations of the runners, while the threaded shanks of the screws removably engage the outer tube $g$. As the runners wear down the screw-heads will wear down correspondingly, but owing to their conical shape will not loose their hold upon the runners until the latter are entirely used up, when the runners may be replaced.

The several layers $d$ $e$ $f$ $g$ are glued together throughout their length and are further connected to each other at suitable intervals by rivets $n$.

The tire is secured to the wheel by means of fastenings composed of screw-bolts $o$, each having an oblong plate or head $o'$. From this head projects at each side of the bolt a prong $o^2$, having an inclined inner face to constitute a wedge. The head $o'$ is received by a corresponding oblong opening of layer $d$ and is covered by a strip $p$, extending over such layer and which also projects over the heads of rivets $n$. The bolt $o$ is received by an opening of felly $a$ and is connected to the latter by nuts $o^3$. The prongs $o^2$ pass through openings in the tire and enter corresponding perforations of rim $b$. In conjunction with bolt $o$ and heads $o'$ they constitute the means for securely fastening the tire to the wheel.

In order to permit the insertion of the inflation-tube and of the fastening into the tire, the layers $e$, $f$, and $g$ of the latter are all cut open in alinement with the meeting ends of layer $d$, Fig. 1.

Means are provided for countersinking the fastening into the wheel-rim while the tire is drawn over the latter. These means consist of a series of longitudinally-extending oblong recesses $b'$, formed in the parts $a$ $b$ of the wheel, each recess being adapted for the reception of one of the heads $o'$. Into the recesses $b'$ open bores $a'$ $a^2$ of the wheel, adapted for the reception of the parts $o$ $o^2$, respectively.

When the tire is to be applied, the fastenings are placed into the openings $b'$ $a'$ $a^2$, so as to be flush with the surface of the wheel. After the tire has been drawn over the wheel the fastenings are pushed through the slitted layers $g$ $f$ $e$ $d$ until their heads $o'$ bear against strip $p$. The fastenings are then turned at right angles and the prongs $o^2$ are projected through the tire into rim $b$. Finally the nuts $o^3$ are tightened up to securely attach the tire to the wheel. Owing to the tapering form of prongs $o^2$, the latter will draw the severed ends of the layers $e$ $f$ $g$ toward each other, and thereby close the gap between such ends.

It will be seen that my improved tire is of great strength, possesses superior wearing qualities, and that its constituent parts may be readily assembled.

What I claim is—

1. A tire provided with an inflation-tube, a surrounding split inner tube, a split outer tube, and a pair of split spirally-wound strips intermediate the inner and outer tubes, the tubes and strips being split in alinement with each other, substantially as specified.

2. In a tire, an outer tube, and a perforated leather runner, combined with a screw having a conical head that engages the runner, and a threaded shank that removably engages the outer tube, substantially as specified.

3. A tire combined with a fastening composed of a head, a bolt, and a pair of tapering prongs projecting from said head, substantially as specified.

Signed by me at New York city, (Manhattan,) New York, this 15th day of November, 1905.

FREDERICK MESINGER.

Witnesses:
FRANK V. BRIESEN,
WILLIAM SCHULZ.